US011835022B2

(12) United States Patent
Kobayashi et al.

(10) Patent No.: US 11,835,022 B2
(45) Date of Patent: Dec. 5, 2023

(54) ENGINE WORKING APPARATUS

(71) Applicants: YAMABIKO CORPORATION, Tokyo (JP); OPPAMA INDUSTRY CO., LTD., Kanagawa-ken (JP)

(72) Inventors: Yuta Kobayashi, Tokyo (JP); Takahiro Yamazaki, Tokyo (JP); Yuichi Tsuyuki, Kanagawa-ken (JP); Kohsuke Watanabe, Kanagawa-ken (JP)

(73) Assignees: YAMABIKO CORPORATION, Tokyo (JP); OPPAMA INDUSTRY CO., LTD., Kanagawa-Ken (JP)

( * ) Notice: Subject to any disclaimer, the term of this patent is extended or adjusted under 35 U.S.C. 154(b) by 0 days.

(21) Appl. No.: 17/583,197

(22) Filed: Jan. 25, 2022

(65) Prior Publication Data

US 2022/0235731 A1 Jul. 28, 2022

(30) Foreign Application Priority Data

Jan. 28, 2021 (JP) ................................ 2021-012090

(51) Int. Cl.
*F02P 5/00* (2006.01)
*F02P 5/15* (2006.01)

(52) U.S. Cl.
CPC .................................. *F02P 5/1504* (2013.01)

(58) Field of Classification Search
CPC ...... F02P 5/00; F02P 5/04; F02P 5/145; F02P 5/15; F02P 5/1502; F02P 5/1504
See application file for complete search history.

(56) References Cited

U.S. PATENT DOCUMENTS 4,883,033 A * 11/1989 Hosoe .................. F02P 5/1504 123/406.61
4,953,532 A * 9/1990 Nagano ................ F02P 5/1504 123/406.51
5,619,976 A * 4/1997 Kitagawa ............ F02D 41/1477 123/679
9,109,569 B2 8/2015 Kunert et al.
9,188,066 B2 11/2015 Yamashita et al.
2005/0188953 A1* 9/2005 Ishikawa .............. F02D 31/003 123/339.11
2008/0053404 A1* 3/2008 Mizuno ................ F02D 35/028 123/406.19
2021/0339732 A1* 11/2021 Lee .................... F02N 11/0848

* cited by examiner

*Primary Examiner* — Phutthiwat Wongwian
*Assistant Examiner* — Sherman D Manley
(74) *Attorney, Agent, or Firm* — HAUPTMAN HAM, LLP

(57) ABSTRACT

Provided is an engine working apparatus capable of smoothly decelerating an engine. The engine working apparatus includes: an internal combustion engine including a piston reciprocally movable in a cylinder and a combustion chamber defined by the piston; an ignition plug configured to ignite air-fuel mixture in the combustion chamber; a detector configured to detect a rotation number of the internal combustion engine; and a controller configured to control an ignition timing of the ignition plug based on the detected rotation number, execute feedback control of determining the ignition timing based on a deviation between a target rotation number and the detected rotation number, and to execute the feedback control when the detected rotation number satisfies a predetermined deceleration condition.

11 Claims, 6 Drawing Sheets

ENGINE WORKING APPARATUS

RELATED APPLICATIONS

The present application claims priority to Japanese Application Number 2021-012090, filed Jan. 28, 2021, the disclosure of which is hereby incorporated by reference herein in its entirety.

BACKGROUND

The present invention relates to an engine working apparatus for controlling a rotation number of an engine.

There has been known an engine control method which detects deceleration in a region on a lower side of a clutch-in rotation number for transition to an idle rotation number during deceleration, to thereby make adjustment toward a late side (for example, see U.S. Pat. No. 9,109,569)

There has also been known an engine control method which detects deceleration in a region equal to or higher than the clutch-in rotation number for the transition to the idle rotation number during the deceleration, to thereby make adjustment to a retarded side (for example, see U.S. Pat. No. 9,188,066).

The engine control methods mentioned above are configured to make the adjustment to the retarded side when the deceleration is detected. However, the rotation number of the engine is liable to fluctuate during the deceleration, and it has thus been difficult to achieve sufficiently smooth deceleration in accordance with the fluctuation of the rotation number of the engine.

SUMMARY OF THE INVENTION

The present invention has been made in view of the problem mentioned above, and has an object to provide an engine working apparatus capable of achieving smooth deceleration.

An engine working apparatus according to at least one embodiment of this invention has a feature in that the engine working apparatus includes: an internal combustion engine including a piston reciprocally movable in a cylinder and a combustion chamber defined by the piston; an ignition plug configured to ignite air-fuel mixture in the combustion chamber; a detector configured to detect a rotation number of the internal combustion engine; and a controller configured to control an ignition timing of the ignition plug based on the detected rotation number, execute feedback control of determining the ignition timing based on a deviation between a target rotation number and the detected rotation number, and to execute the feedback control when the detected rotation number satisfies a predetermined deceleration condition.

The engine can be smoothly decelerated.

DETAILED DESCRIPTION OF THE EMBODIMENTS

<<First Aspect>>

Figure 1:
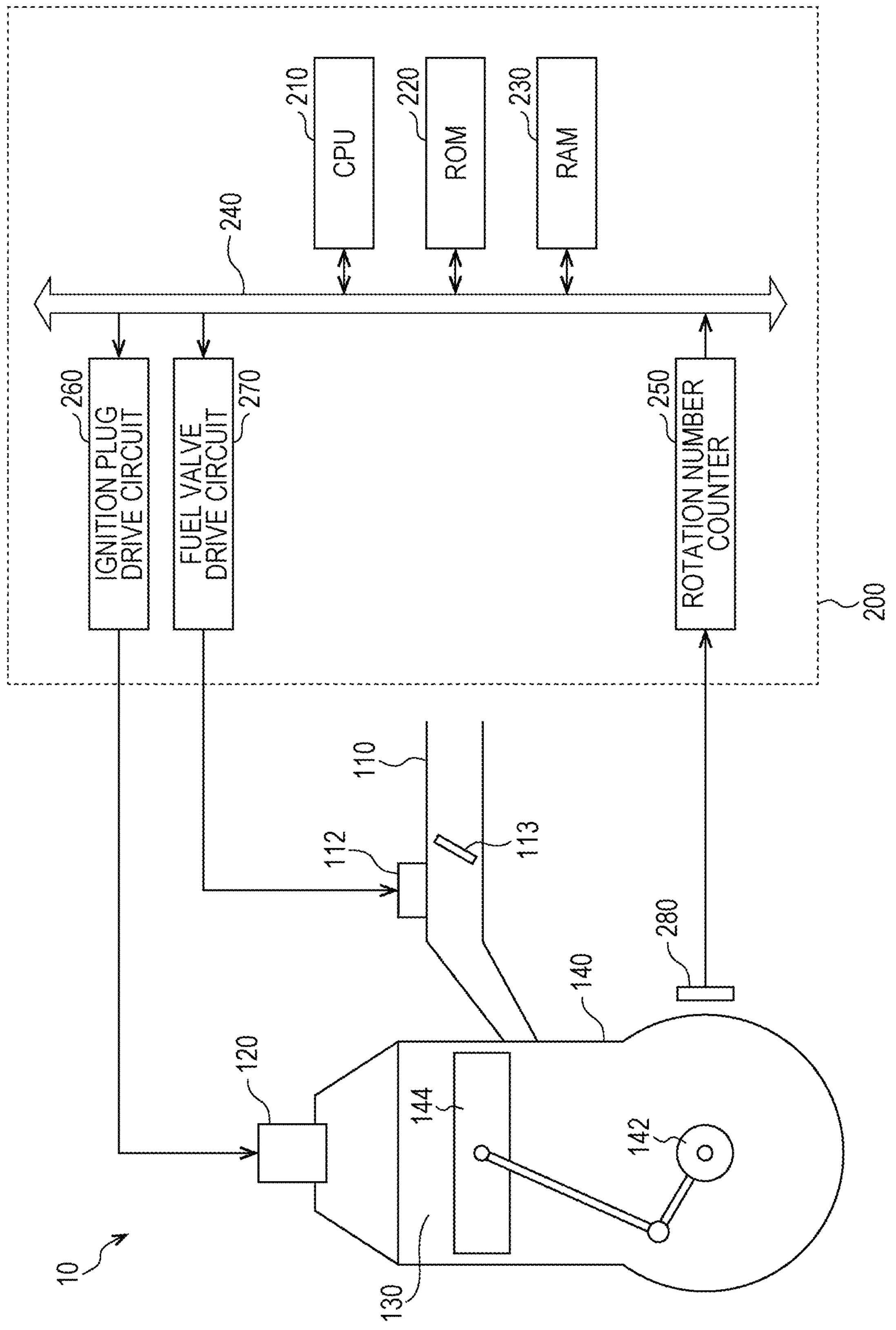
FIG. 1 is a block diagram for illustrating a configuration of an internal combustion engine (10) in an example of one embodiment of this invention.

According to a first aspect of this invention, there is provided an engine working apparatus including: an internal combustion engine including a piston reciprocally movable in a cylinder and a combustion chamber defined by the piston; an ignition plug configured to ignite air-fuel mixture in the combustion chamber; a detector configured to detect a rotation number of the internal combustion engine; and a controller configured to control an ignition timing of the ignition plug based on the detected rotation number, execute feedback control of determining the ignition timing based on a deviation between a target rotation number and the detected rotation number, and to execute the feedback control when the detected rotation number satisfies a predetermined deceleration condition.

The controller controls the ignition timing of the ignition plug based on the detected rotation number. The ignition timing is determined through the feedback control. The feedback control determines the ignition timing based on the deviation between the target rotation number and the detected rotation number. The controller executes the feedback control when the detected rotation number satisfies the predetermined deceleration condition.

The ignition timing may be determined through map control. The map control uses a control map which stores, in advance, a relationship between the rotation number and the ignition timing of the internal combustion engine. The ignition timing is determined by referring to the control map from the detected rotation number.

Since the feedback control is executed during the deceleration, the ignition timing is appropriately determined in accordance with fluctuation of the rotation number of the engine even during the deceleration in which the rotation number of the engine is liable to fluctuate, and the engine can sufficiently smoothly be decelerated. In this case, in particular, delays in supply (responsiveness) of the fuel and the air to the combustion chamber are resolved, thereby being capable of assisting an optimal behavior of the engine.

The feedback control is executed when the detected rotation number satisfies the predetermined deceleration condition and this feedback control includes a case of switching from the map control, and a case of switching from the first type feedback control to the second type feedback control among a plurality of types of feedback control (such as a first type feedback control and a second type feedback control).

<<Second Aspect>>

According to a second aspect of this invention, in the first aspect, the predetermined deceleration condition includes one of a condition that the detected rotation number becomes lower than a predetermined rotation number (for example, assist upper limit rotation number described later) and a condition that the rotation number of the internal combustion engine falls within a predetermined rotation number range (for example, a deceleration assist range described later).

When it is determined that the detected rotation number becomes lower than the predetermined rotation number, the control can be switched quickly. Moreover, when it is determined that the detected rotation number falls within the predetermined rotation number range, it is possible to suppress influence of rotation fluctuation, noise on a signal, and the like, thereby being capable of making appropriate determination. Moreover, the predetermined rotation number may be determined so that an operation of a worker for intentionally bringing about an idle operation state can be detected. For example, there is provided a configuration in which deceleration caused by load fluctuation does not satisfy the predetermined deceleration condition, to thereby prevent the feedback control from starting.

<<Third Aspect>>

According to a third aspect of this invention, in the first or second aspect, the controller is configured to execute the feedback control when the detected rotation number is a rotation number higher than a predetermined clutch-in rotation number.

The deceleration is detected earlier than the deceleration is detected after the detected rotation number reaches the clutch-in rotation number, thereby being capable of executing the feedback control.

<<Fourth Aspect>>

According to a fourth aspect of this invention, in the first to third aspects, the feedback control is executed toward the target rotation number.

An appropriate ignition timing can be determined in accordance with the detected rotation number in order to achieve the target rotation number.

<<Fifth Aspect>>

According to a fifth aspect of this invention, in the fourth aspect, the target rotation number is a target idle rotation number.

<<Sixth Aspect>>

According to a sixth aspect of this invention, in the fourth aspect, the target rotation number is a target deceleration rotation number.

<<Seventh Aspect>>

According to a seventh aspect of this invention, in the first to sixth aspects, the feedback control includes PI control.

An appropriate ignition timing can be determined in accordance with the detected rotation number.

<<Eighth Aspect>>

According to an eighth aspect of this invention, in the first to seventh aspects, the controller is configured to cancel the feedback control when the detected rotation number becomes lower than a predetermined threshold value during the execution of the feedback control.

After the rotation number is appropriately reduced through the feedback control, the feedback control can be finished.

<<Ninth Aspect>>

According to a ninth aspect of this invention, in the first to seventh aspects, the controller is configured to cancel the feedback control when at least one of a condition that a predetermined period has elapsed since the detected rotation number became lower than a predetermined threshold value during the execution of the feedback control or a condition that the detected rotation number reaches a predetermined engine rotation number during the execution of the feedback control is satisfied.

The feedback control can be canceled after the detected rotation number is reduced to be lower than the predetermined threshold value and the operation then becomes sufficiently stable compared with the operation during the idle operation.

<<Tenth Aspect>>

According to a tenth aspect of this invention, in the eighth or ninth aspect, the controller is configured to increase fuel to be supplied to the combustion chamber when the detected rotation number exceeds an idle upper limit speed after the feedback control is canceled.

The detected rotation number can be reduced to be lower than the idle upper limit speed by supplying an optimal amount of fuel to the combustion chamber to reduce the rotation number of the engine.

<<<Internal Combustion Engine 10>>>

FIG. 1 is a block diagram for illustrating a configuration of an internal combustion engine 10 in an example of one embodiment of this invention. The internal combustion engine 10 in the example of this embodiment is a two-stroke gasoline engine.

The internal combustion engine 10 in the example of this embodiment mainly includes a carburetor 110, an ignition plug 120, a combustion chamber 130, a cylinder 140, a crankshaft 142, a piston 144, and a control device 200.

<<Carburetor 110>>

The carburetor 110 includes a throttle valve 113 for adjusting an amount of air-fuel mixture flowing into the internal combustion engine 10 and a fuel valve 112 for adjusting an amount of the fuel. The throttle valve 113 is operated by the worker. The fuel valve 112 is driven by a solenoid (not shown). The throttle valve 113 and the fuel valve 112 have hitherto been known. The fuel valve 112 in the example of the at least one embodiment is closed when current is not flowing through the solenoid (normal state), and is thus normally closed. The air-fuel mixture that has passed through the throttle valve 113 and the fuel valve 112 is sucked into the combustion chamber 130 through the operation of the piston 144.

The ignition plug 120 is arranged at an upper portion of the cylinder 140. The internal combustion engine 10 includes an ignition device (not shown) for operating the ignition plug 120. The air-fuel mixture sucked into the combustion chamber 130 is combusted by the ignition device through spark discharge of the ignition plug 120. The piston 144 is moved downward through an increase in volume of the air-fuel mixture caused by the combustion, and the motion of the piston 144 is transmitted to the crankshaft 142, to thereby convert the transmitted motion to a rotational motion of the crankshaft 142.

<<Cylinder 140, Crankshaft 142, and Piston 144>>

The piston 144 is arranged in the cylinder 140, and is connected to the crankshaft 142. The piston 144 moves upward to a top dead center in a compression stroke of the internal combustion engine 10. The air-fuel mixture is combusted at a predetermined ignition timing before the piston 144 reaches the top dead center, to thereby apply a downward propelling force to the piston 144.

<<<Control Device 200>>>

The control device 200 in the example of this embodiment includes, in addition to a central processing unit (CPU) 210, a read-only memory (ROM) 220, a random access memory (RAM) 230, and an input/output bus 240, a rotation number counter 250, an ignition plug drive circuit 260, and a fuel valve drive circuit 270.

To the above-mentioned input/output bus 240, the ROM 220, the RAM 230, and the ignition plug drive circuit 260 are connected. The ignition plug drive circuit 260 is a circuit for driving the ignition plug 120. The input/output bus 240 allows a data signal or an address signal to be input to and output from the CPU 210.

When an ignition control command issued from the CPU 210 is supplied to the ignition plug drive circuit 260, the ignition plug 120 is ignited, to thereby combust the air-fuel mixture sucked into the combustion chamber 130.

When a valve control signal issued from the CPU 210 is supplied to the fuel valve drive circuit 270, the fuel valve drive circuit 270 supplies a drive signal to the solenoid of the fuel valve 112. The fuel valve 112 opens in accordance with the valve control signal.

A crankshaft reference position detection device 280 is provided in a vicinity of the crankshaft 142. The crankshaft reference position detection device 280 is connected to the input/output bus 240. The crankshaft reference position detection device 280 outputs one reference pulse signal when the crankshaft 142 reaches a predetermined reference position, for example, when the piston 144 reaches the top dead center. The reference pulse signal is supplied to the rotation number counter 250. The rotation number counter 250 outputs a rotation number signal indicating the rotation number of the crankshaft 142 of the internal combustion engine 10.

Figure 2:
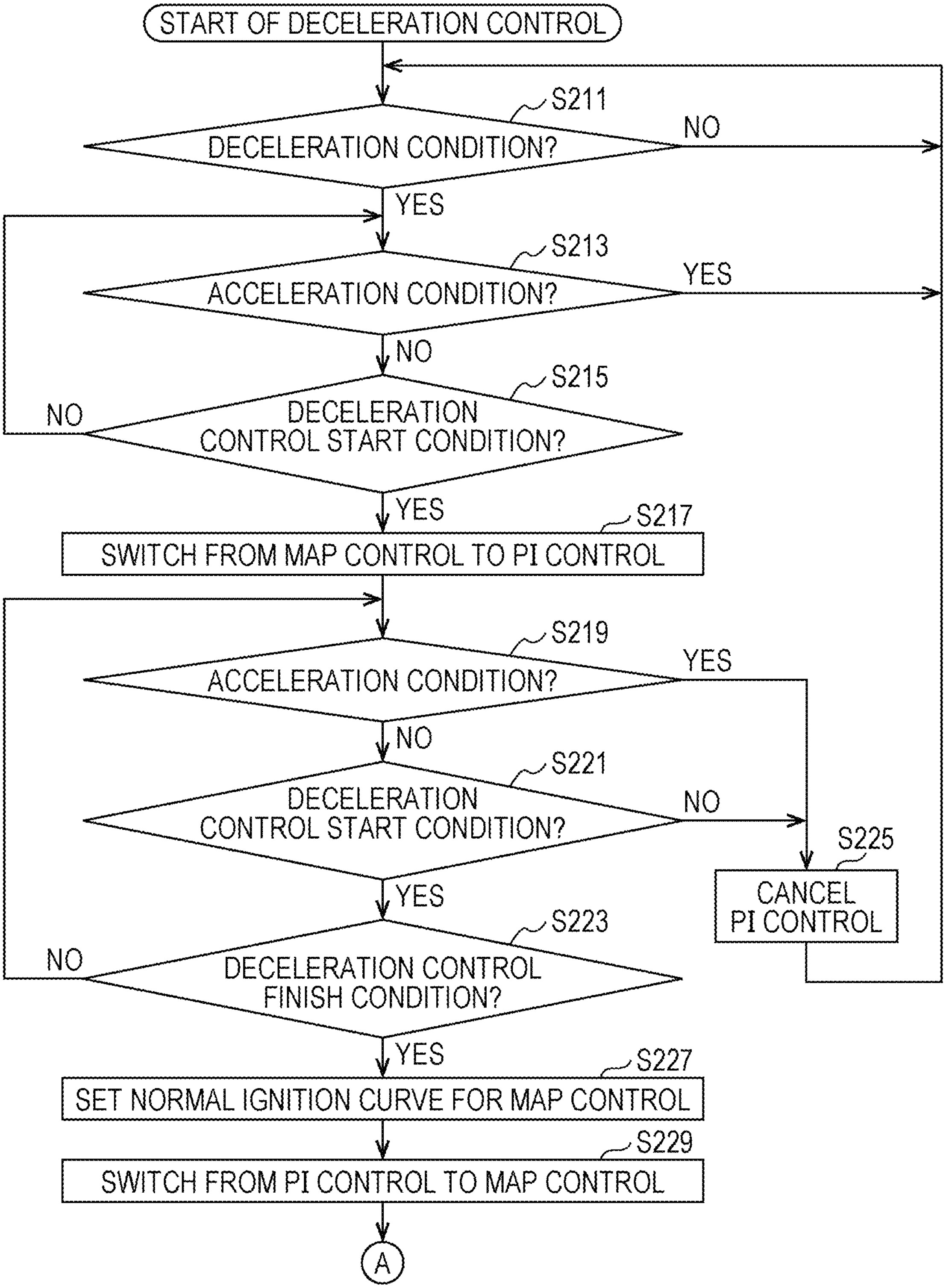
FIG. 2 is a flowchart for illustrating engine control processing in the example of this embodiment.
Figure 3:
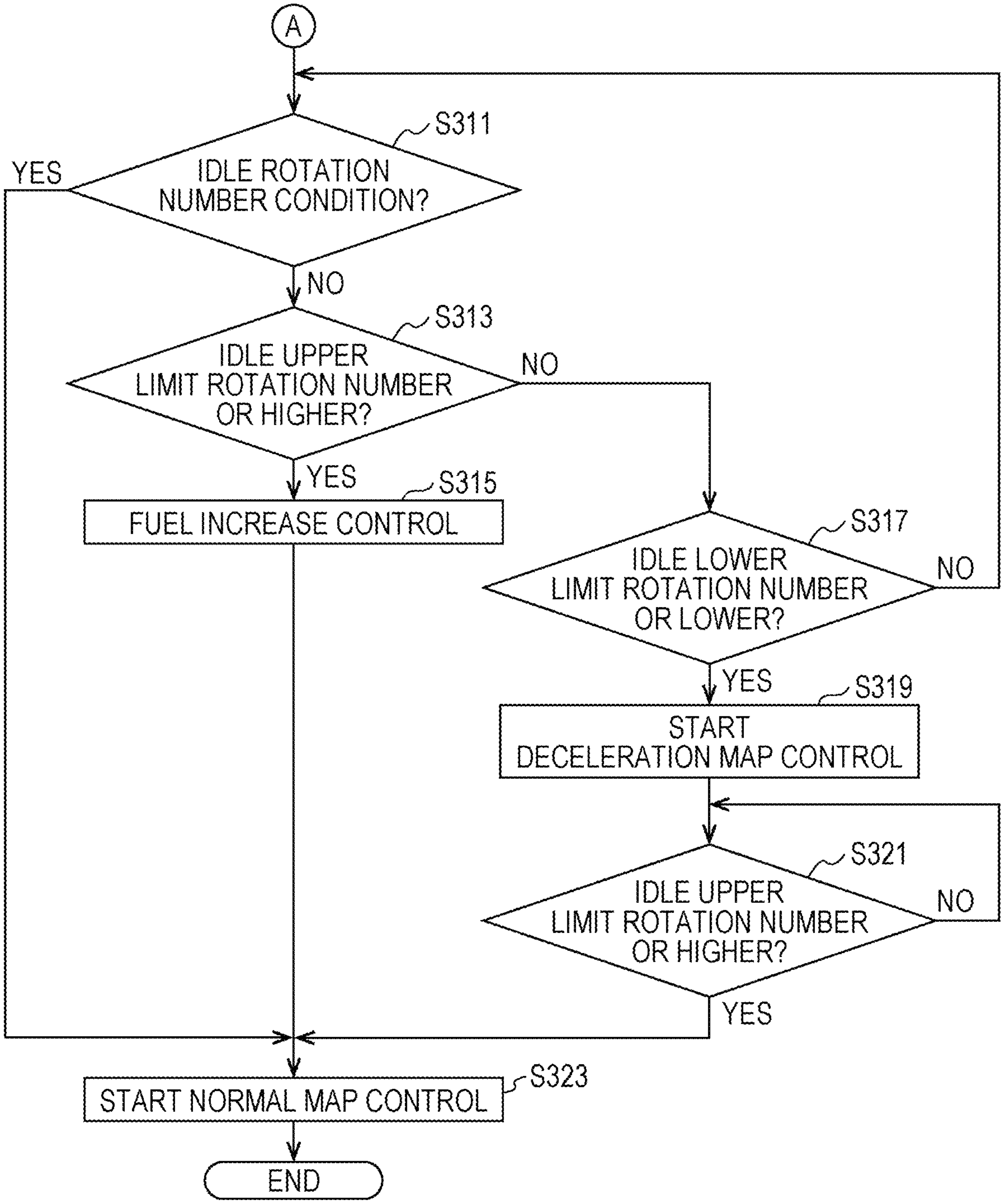
FIG. 3 is a flowchart for illustrating the engine control processing in the example of this embodiment.

The ROM 220 stores a program for executing an engine control processing routine in accordance with flowcharts described with reference to FIG. 2 and FIG. 3.

<<<Engine Control Processing>>>

It is hereinafter assumed that the internal combustion engine 10 has completed startup processing, for example, initialization, and is steadily operating. FIG. 2 and FIG. 3 are flowcharts for illustrating engine control processing in the example of this embodiment. Moreover, FIG. 4A, FIG. 4B, FIG. 4C, FIG. 5A, FIG. 5B, and FIG. 5C are time charts for showing states of the engine in the example of this embodiment.

Figure 4A:
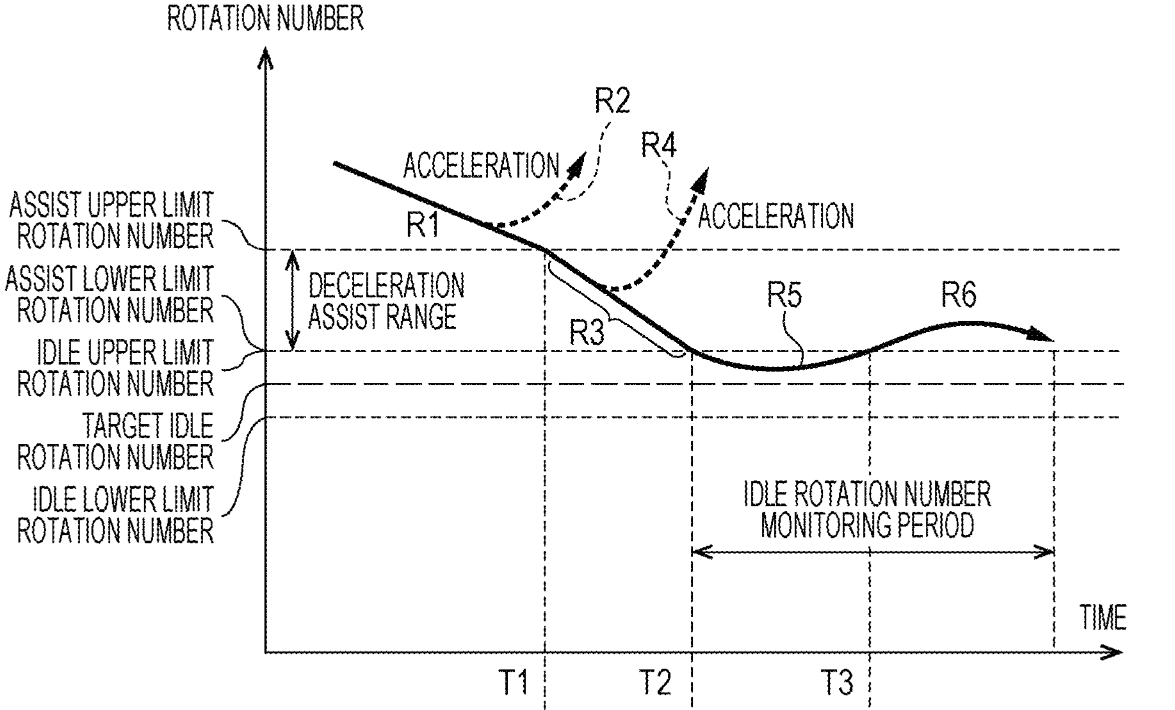
FIG. 4A, FIG. 4B, and FIG. 4C are time charts for showing a state of the engine in a case in which fuel is lean (lean come down) in the example of this embodiment.
Figure 4B:
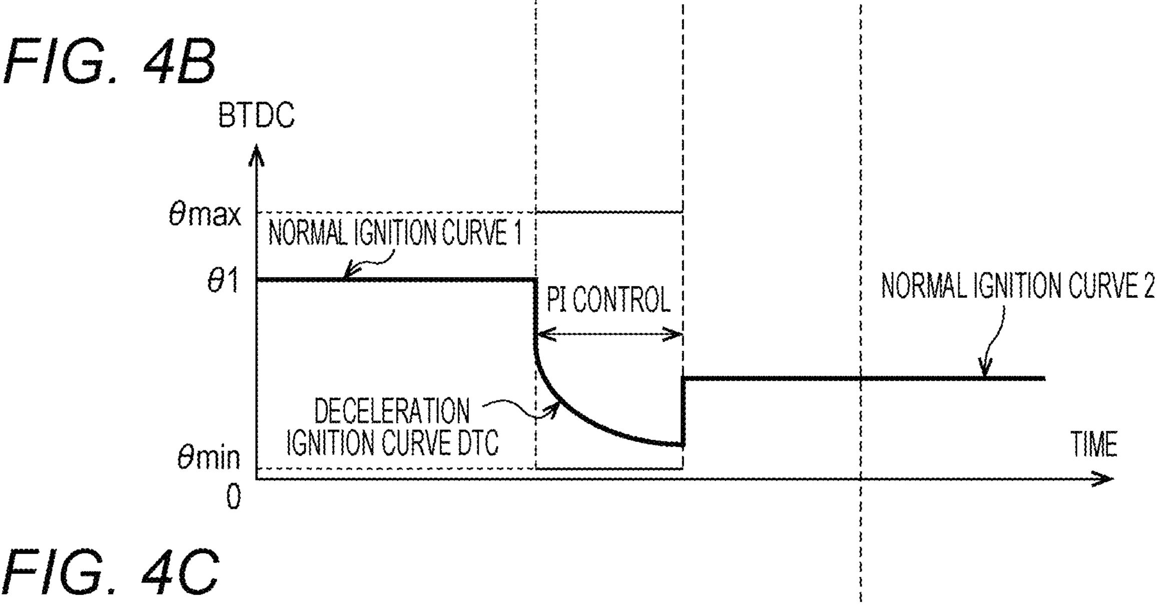
Figure 4C:
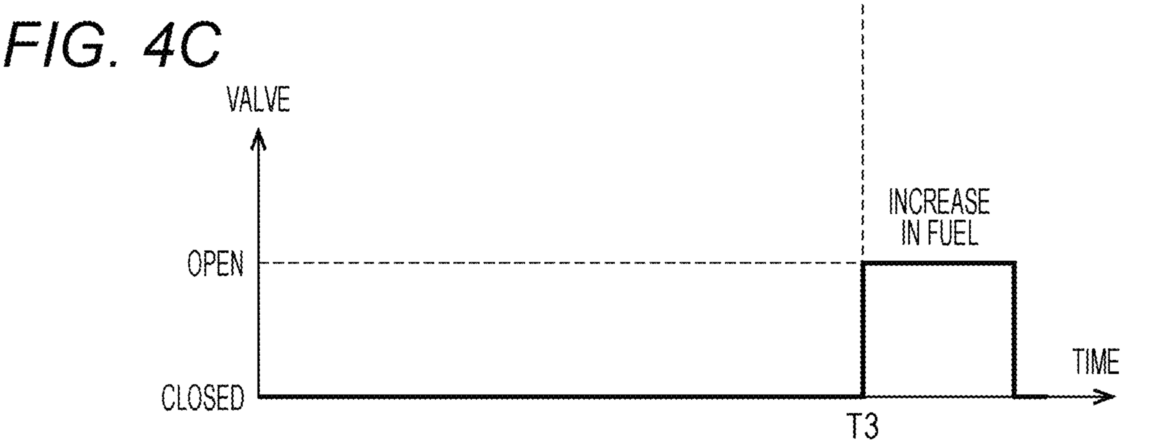

FIG. 4A, FIG. 4B, and FIG. 4C are time charts in a case in which the fuel is lean (lean come down). The time charts show a change in the rotation number (FIG. 4A), a change in the ignition timing (FIG. 4B), and a change in increase of the fuel (FIG. 4C) in a case in which, after the engine is decelerated through the map control, the rotation number is further adjusted toward the target idle rotation number through the PI control for the ignition timing, and the control is returned to the map control, the rotation number becomes higher than an idle upper limit rotation number.

Figure 5A:
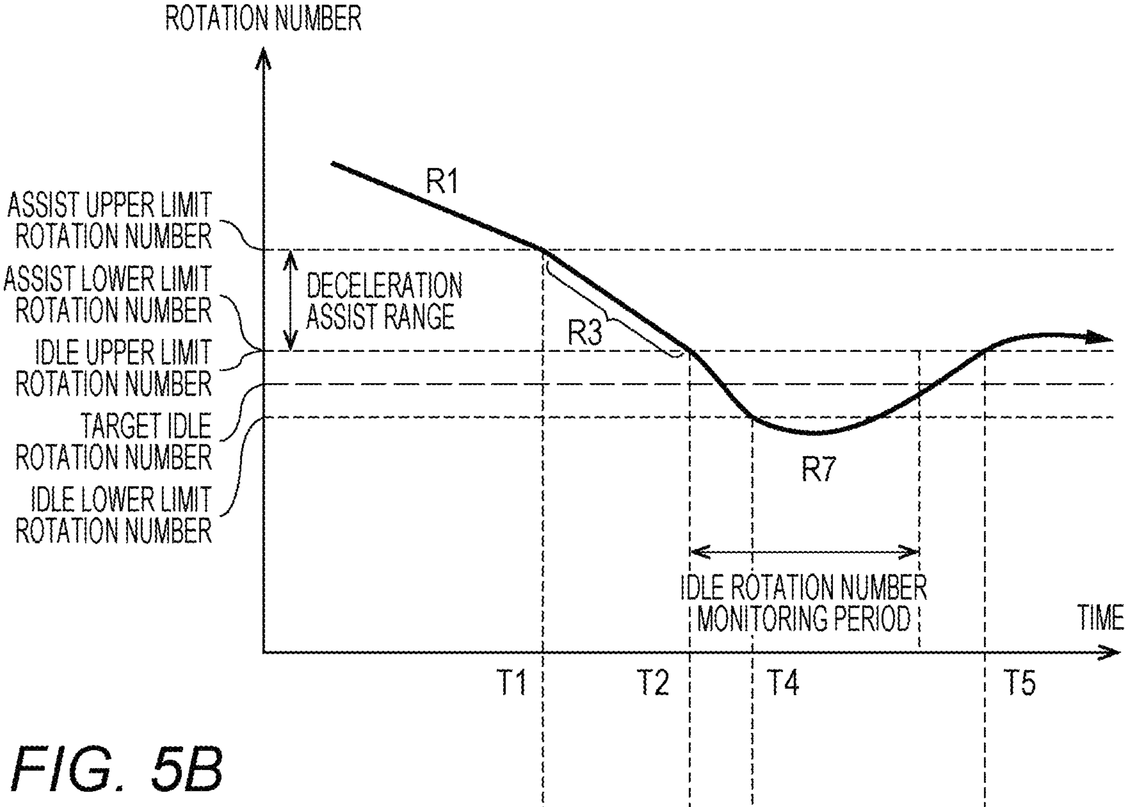
FIG. 5A, FIG. 5B, and FIG. 5C are time charts for showing a state of the engine in a case in which the fuel is rich (rich come down) in the example of this embodiment.
Figure 5B:
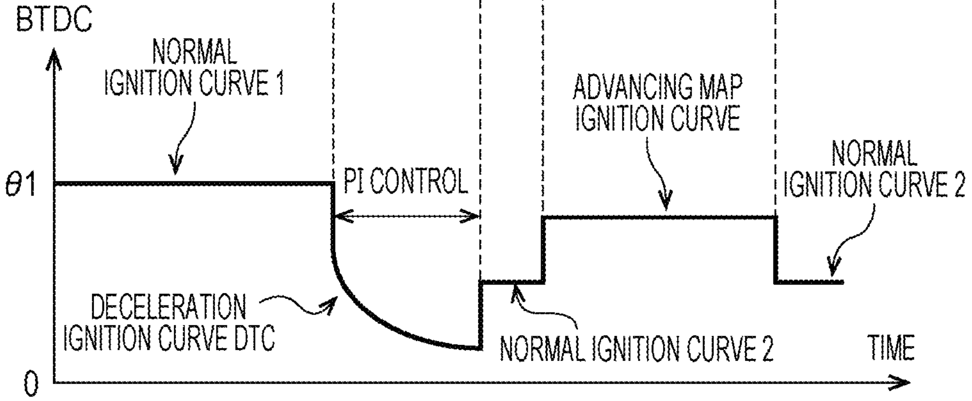
Figure 5C:

FIG. 5A, FIG. 5B, and FIG. 5C are time charts in a case in which the fuel is rich (rich come down). The time charts show a change in the rotation number (FIG. 5A), a change in the ignition timing (FIG. 5B), and a change in increase of the fuel (FIG. 5C) in a case in which, after the engine is decelerated through the map control, the rotation number is further adjusted toward the target idle rotation number through the PI control for the ignition timing, and the control is returned to the map control, the rotation number becomes lower than an idle lower limit rotation number.

In FIG. 4A, FIG. 4B, FIG. 4C, FIG. 5A, FIG. 5B, and FIG. 5C, the same reference symbols are assigned to common portions.

The CPU 210 in the example of this embodiment first detects the rotation number signal from the rotation number counter 250, and determines whether or not the internal combustion engine 10 is decelerating (Step S211).

For example, when an absolute value of a change amount of the decrease in the rotation number of the crankshaft 142 in a predetermined period becomes larger than a predetermined value, it is determined that the internal combustion engine 10 is decelerating. The determination processing may be executed not only once but also a plurality of consecutive times. With this configuration, it is possible to determine that the engine is decelerating while influence of noise, vibration, and the like is prevented. The decrease in the rotation number corresponds to portions of regions R1 of the time charts of FIG. 4A and FIG. 5A.

When the CPU 210 determines that the internal combustion engine 10 is not decelerating (NO), the process returns to Step S211.

When the CPU 210 determines that the internal combustion engine 10 is decelerating (YES), the CPU 210 detects the rotation number signal from the rotation number counter 250, and determines whether or not the internal combustion engine 10 has been accelerated (Step S213).

The deceleration of the internal combustion engine 10 may be caused by an increase in load. The deceleration of the internal combustion engine 10 due to an increase in load is temporary deceleration. When the load decreases afterwards, the internal combustion engine 10 accelerates (see a region R2 of FIG. 4A).

In the above-mentioned determination processing of Step S213, it is determined whether or not the internal combustion engine 10 has accelerated after the deceleration.

When the CPU 210 determines that the internal combustion engine 10 has been accelerated in the determination processing of Step S213 (YES), the process returns to Step S211.

Meanwhile, when the CPU 210 determines that the internal combustion engine 10 has not been accelerated in the determination processing of Step S213 (NO), that is, the deceleration has been caused by the operation of the worker, the CPU 210 determines whether or not a deceleration control start condition is satisfied (Step S215).

The deceleration control start condition is a condition that the rotation number of the crankshaft 142 becomes lower than an assist upper limit rotation number for the deceleration control (see FIG. 4A) or a condition that the rotation number falls within a deceleration assist range for the deceleration control (see FIG. 4A) (see regions R3 of FIG. 4A and FIG. 5A). The assist upper limit rotation number is a rotation number higher than the clutch-in rotation number. With this configuration, the deceleration caused by the operation of the worker is discriminated, to thereby be capable of starting optimal ignition control at an early stage.

The deceleration of the internal combustion engine 10 may mainly include a case of being caused by the operation of the worker and a case of being caused by an increase in load. When the rotation number becomes lower than the assist upper limit rotation number, it is determined that the deceleration is caused by the operation of the worker. The deceleration caused by the operation of the worker is a stop operation, and the internal combustion engine 10 monotonically decelerates.

When, as the deceleration control start condition, it is determined whether or not the rotation number becomes lower than the assist upper limit rotation number, the control can be switched quickly. Meanwhile, when, as the deceleration control start condition, it is determined whether or not the rotation number falls within the deceleration assist range, it is possible to appropriately determine whether or not the deceleration control start condition is satisfied without influence of rotation fluctuation and noise on the rotation number signal of the crankshaft 142 and the like.

When the CPU 210 determines that the deceleration control start condition is not satisfied in the determination processing of Step S215 (NO), the process returns to Step S213.

Meanwhile, when the CPU 210 determines that the deceleration control start condition is satisfied in the determination processing of Step S215 (YES), the CPU 210 switches the control to the PI control (Step S217). Through the processing of Step S217, the PI control for the ignition timing to achieve the target idle rotation number shown in FIG. 4A and have a normal ignition map (not shown) as a reference is started.

Figure 6:
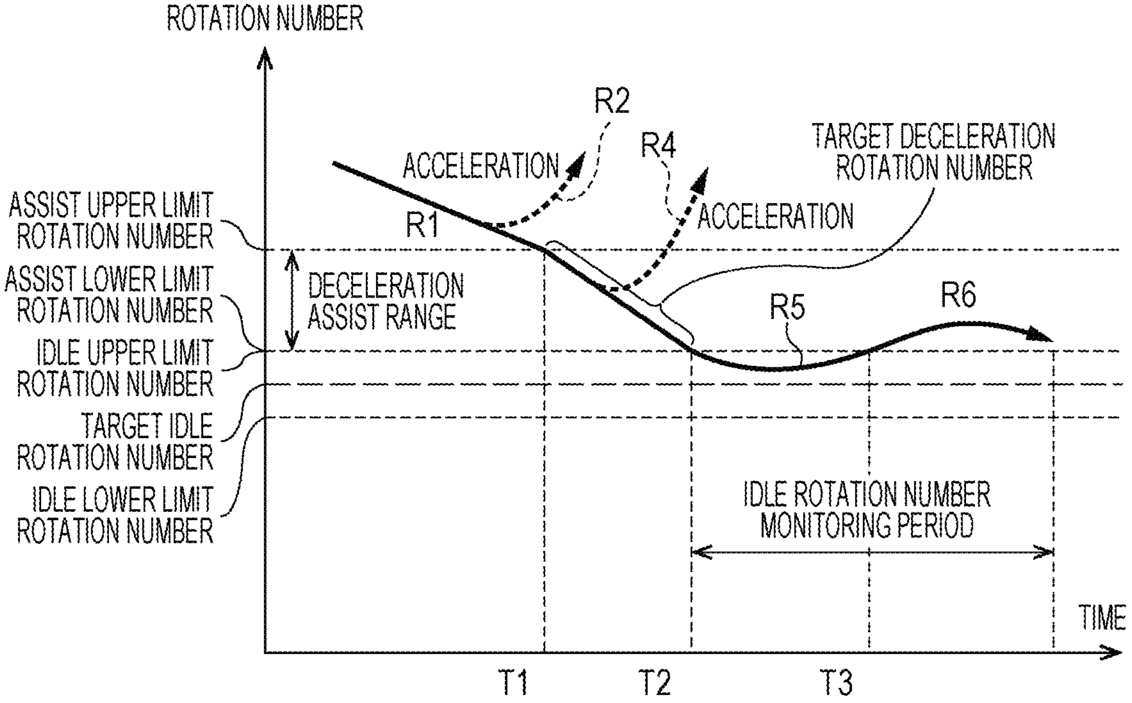
FIG. 6 is a time chart for showing a state of the engine in a case in which when PI control for ignition timing is executed toward a target deceleration rotation number in the example of this embodiment.

Moreover, when the CPU 210 determines that the deceleration control start condition is satisfied (YES), as shown in FIG. 6, the PI control for the ignition timing to achieve a target deceleration (change in rotation number in a predetermined period) (target deceleration rotation number) may be executed through the processing of Step S217.

The proportional-integral (PI) control is a type of the feedback control. The PI control controls an input value based on a deviation between an output value and a target value and a period in which the deviation occurs through proportional control (P control) and integral control (I control). The ignition timing is determined through the PI control.

Instead of the PI control, the proportional-integral-differential (PID) control may be used. In the PID control, the input value is controlled based on the deviation between the output value and the target value, the period in which the deviation occurs, and a temporal change rate of the deviation.

Moreover, the PI control or the PID control may be selected for the control in accordance with the fluctuation of the rotation number and the like. Further, the ignition timing may be determined through feedback control other than the PI control and the PID control.

The ignition timing is determined based on the deviation between the actual rotation number and the target rotation number through the feedback control, for example, the PI control, and it is thus possible to more appropriately determine the ignition timing than the map control during the deceleration in which the rotation number is relatively unstable. Moreover, through the feedback control, an optimal ignition timing can be determined to execute the ignition irrespective of whether the lean come down or the rich come down is executed.

The map control is control of determining the ignition timing through use of a reference table (not shown) which stores, in advance, correspondence between the rotation number and the ignition timing of the internal combustion engine 10. The reference table is searched based on the rotation number detected by the rotation number counter 250 to determine the ignition timing corresponding to the detected rotation number.

When the control is switched to the PI control in the processing of Step S217, an ignition timing corresponding to the rotation number at that time is first acquired as an initial value from the reference table for the map control, to thereby ignite the ignition plug 120. For the next and later rotation, the acquired ignition timing is used to determine the ignition timing at that time through the PI control so that the target rotation number is achieved.

In the time charts of FIG. 4A and FIG. 4B, the ignition timing is determined through the map control at a time point before a time T1 so that the ignition timing follows a normal ignition curve 1 (FIG. 4B).

When the map control is switched to the PI control through the processing of Step S217 (at the time T1 of FIG. 4A), the ignition timing is determined through the PI control so that the target idle rotation number is attained. In this case, an upper limit timing θmax and a lower limit timing θmin are set as shown in FIG. 4B so that an excessive retarding of the ignition timing or an excessive advancing of the ignition timing does not occur during the PI control.

After that, the CPU 210 determines whether or not the internal combustion engine 10 has accelerated (Step S219). That is, also during the deceleration through the PI control (regions R3 of FIG. 4A and FIG. 5A), the CPU 210 determines whether or not the internal combustion engine 10 has been accelerated (region R4 of FIG. 4A). The determination of the acceleration in this case is also made in order to exclude the deceleration caused by the increase in load.

When the CPU 210 determines that the internal combustion engine 10 has accelerated (YES), the CPU 210 cancels the PI control (Step S225), and the process returns to Step S211. As a result, the map control is started again.

When the CPU 210 determines that the internal combustion engine 10 has not accelerated in the determination processing of Step S219 (NO), the CPU 210 determines whether or not the deceleration control start condition is satisfied (Step S221). When the CPU 210 determines that the deceleration control start condition is not satisfied, that is, the rotation number is equal to or higher than the assist upper limit rotation number (NO), the CPU 210 cancels the PI control (Step S225). Then, the process returns to Step S211. As a result, the map control is started again.

When the CPU 210 determines that the deceleration control start condition is satisfied, that is, the rotation number is lower than the assist upper limit rotation number in the determination processing of Step S221 (YES), the CPU 210 determines whether or not a deceleration control finish condition has been satisfied (Step S223).

The deceleration control finish condition is a condition that the rotation number of the crankshaft 142 becomes lower than the assist lower limit rotation number (see FIG. 4A) for the deceleration control or a condition that the rotation number deviates from the deceleration assist range (see FIG. 4A) for the deceleration control. That is, it is determined that whether or not the rotation number of the crankshaft 142 has become no longer the control target of the PI control. Moreover, in this case, as the deceleration control finish condition, a condition that a predetermined period has elapsed since the rotation number became lower than the assist lower limit rotation number may be added. As a result, the rotation number further comes close to the target idle rotation number, and the idle operation becomes more stable.

When the CPU 210 determines that the deceleration control finish condition is satisfied (YES), the CPU 210 sets a normal ignition curve 2 for the map control (see FIG. 4B) (Step S227) (time T2 of FIG. 4A). The normal ignition curve 2 for the map control is data that defines a target value for determining the ignition timing through the map control. The ignition timing is determined through the map control so that the ignition timing follows the normal ignition curve 2 of FIG. 4B.

After that, the CPU 210 switches the engine control from the PI control to the map control (Step S229). As a result, the PI control is canceled.

After that, the CPU 210 determines whether or not an idle rotation number monitoring period has elapsed since the engine control was returned to the map control (Step S311).

When the CPU 210 determines that the idle rotation number monitoring period has not elapsed (NO), the CPU 210 determines whether or not the rotation number of the internal combustion engine 10 has become equal to or higher than the idle upper limit rotation number (Step S313). In this embodiment, the assist lower limit rotation number and the idle upper limit rotation number are the same rotation number. However, the assist lower limit rotation number and the idle upper limit rotation number may be set to rotation numbers different from each other.

When the CPU 210 determines that the rotation number of the internal combustion engine 10 has become equal to or higher than the idle upper limit rotation number after the engine control was returned to the map control in the determination processing of Step S313 (YES), the CPU 210 increases the amount of fuel supplied to the combustion chamber 130 (Step S315) (see time T3 of FIG. 4C). In the case of lean come down, when the rotation becomes equal to or higher than the idle upper limit rotation number during the idle rotation number monitoring period, the CPU 210 increases the amount of fuel. As a result, an optimal amount of fuel is supplied into the combustion chamber 130, to thereby reduce the rotation number of the internal combustion engine 10 to a rotation number lower than the idle upper limit rotation number (region R6 of FIG. 4A).

When the CPU 210 determines that the rotation number of the internal combustion engine 10 is lower than the idle upper limit rotation number in the determination processing of Step S313 (NO), the CPU 210 determines whether or not the rotation number of the internal combustion engine 10 has become equal to or lower than the idle lower limit rotation number (Step S317).

When the CPU 210 determines that the rotation number of the internal combustion engine 10 has become equal to or lower than the idle lower limit rotation number in the determination processing of Step S317 (YES), the CPU 210 selects an advancing map ignition curve, and execute the map control (Step S319) (see time 14 of FIG. 5A, and FIG. 5B). In the case of the rich come down, when the rotation number becomes equal to or lower than the idle lower limit rotation number during the idle rotation number monitoring period, the CPU 210 increases the rotation number of the internal combustion engine 10 through the map control based on the advancing map ignition curve (region R7 of FIG. 5A).

The CPU 210 determines whether or not the rotation number of the internal combustion engine 10 has become equal to or higher than the idle upper limit rotation number (Step S321). When the rotation number of the internal combustion engine 10 is lower than the idle upper limit rotation number, the process returns to Step S321. With this configuration, the ignition timing is determined through the map control based on the advancing map ignition curve until the rotation number becomes equal to or higher than the idle upper limit rotation number (time T5 of FIG. 5A and FIG. 5B) even when the idle rotation number monitoring period has elapsed.

When the CPU 210 determines that the rotation number of the internal combustion engine 10 is higher than the idle lower limit rotation number in the determination processing of Step S317 (NO), the process returns to Step S311.

When the CPU 210 determines that the idle rotation number monitoring period has elapsed in the determination processing of Step S311 (YES), executes the processing of Step S315, or determines that the rotation number of the internal combustion engine 10 is higher than the idle upper limit rotation number in the determination processing of Step S321 (YES), the CPU 210 determines that the rotation number of the internal combustion engine 10 becomes the idle rotation number, and starts normal map control (Step S323). Then, the CPU 210 finishes this subroutine.

<<<Scope of this Embodiment>>>

As described above, this invention has been described by way of this embodiment, but it should not be understood that the description and the drawings that form a part of this disclosure invention limit this disclosure. This invention includes various embodiments and others which are not described herein.

What is claimed is:

1. An engine working apparatus, comprising:

an internal combustion engine including a piston reciprocally movable in a cylinder and a combustion chamber defined by the piston;

an ignition plug configured to ignite air-fuel mixture in the combustion chamber;

a detector configured to detect a rotation number of the internal combustion engine; and a controller configured to in response to determining that the internal combustion engine is decelerating and the detected rotation number satisfies a predetermined deceleration condition, execute feedback control of determining an ignition timing of the ignition plug based on a deviation between a target rotation number and the detected rotation number, and in response to determining that the internal combustion engine has been accelerated after the internal combustion engine is determined as being decelerating, cancel the feedback control.

2. The engine working apparatus according to claim 1, wherein the predetermined deceleration condition includes one of a condition that the detected rotation number becomes lower than a predetermined rotation number and a condition that the detected rotation number falls within a predetermined rotation number range.

3. The engine working apparatus according to claim 1, wherein the controller is configured to execute the feedback control in response to the detected rotation number being higher than a predetermined clutch-in rotation number.

4. The engine working apparatus according to claim 1, wherein the controller is configured to execute the feedback control toward the target rotation number.

5. The engine working apparatus according to claim 4, wherein the target rotation number is a target idle rotation number.

6. The engine working apparatus according to claim 4, wherein the target rotation number is a target deceleration rotation number.

7. The engine working apparatus according to claim 1, wherein the feedback control includes proportional integral control.

8. The engine working apparatus according to claim 1, wherein the controller is configured to cancel the feedback control in response to the detected rotation number becoming lower than a predetermined threshold value during the execution of the feedback control.

9. The engine working apparatus according to claim 1, wherein the controller is configured to cancel the feedback control in response to at least one of a condition that a predetermined period has elapsed since the detected rotation number became lower than a predetermined threshold value during the execution of the feedback control, or a condition that the detected rotation number reaches a predetermined engine rotation number during the execution of the feedback control, being satisfied.

10. The engine working apparatus according to claim 8, wherein the controller is configured to increase fuel to be supplied to the combustion chamber in response to the detected rotation number exceeding an idle upper limit speed after the feedback control is canceled.

11. The engine working apparatus according to claim 1, wherein the controller is configured to determine, before executing the feedback control, whether the internal combustion engine has not been accelerated since the internal combustion engine was determined as decelerating.

* * * * *